United States Patent Office 3,144,390
Patented Aug. 11, 1964

3,144,390
PROCESS FOR THE PURIFICATION
OF INTERFERON
Derek C. Burke, Aberdeen, Scotland, assignor to National Research Development Corporation, London, England, a British corporation
No Drawing. Filed June 21, 1961, Ser. No. 118,513
Claims priority, application Great Britain June 28, 1960
4 Claims. (Cl. 167—78)

This invention relates to a process for the purification of interferon.

Interferon was discovered by Isaacs and Lindemann in 1957 (Proc. Roy. Soc. B147 (1957) 258), during a study of interference induced by heat-inactivated influenza virus in chick chorio-allantoic membranes. It is a virus-interfering substance different from the inactivated virus. In every case so far examined, it was found to be formed whenever virus interference was established and appears to be the mediator of virus interference. Interferon is capable of inhibiting the multiplication of a number of viruses, including such different viruses as the DNA containing vaccinia virus and the RNA containing West Nile virus. Previously published work has shown that interferon is probably a protein, stable over the pH range 2-11, but destroyed by heating to 100° C. for five minutes.

The present invention provides a process for the purification of interferon which comprises subjecting a concentrate of interferon in a salt solution to pressure dialysis to produce a solution containing a largely increased content of interferon, subjecting this solution to chromatography at a pH of between 5.5 and 8 on diethylaminoethylcellulose with an increasing phosphate gradient, before or after said chromatography subjecting the solution to chromatography on diethylaminoethylcellulose at a pH of from 4.4 to 4.6 and recovering interferon of increased purity and concentration from the chromatograms.

The initial concentrate may be prepared by salting out a concentrate from an aqueous preparation containing interferon for example with ammonium sulphate.

Furthermore the solution from the pressure dialysis may be subjected to chromatography on sulphomethylcellulose at a pH of about 2 with an increasing chloride gradient.

According to a preferred embodiment the present invention provides a process for the purification of interferon which comprises salting out a concentrate from an aqueous preparation containing interferon, dissolving the salted-out material in a buffered salt solution, subjecting this to pressure dialysis to produce a solution containing a largely increased content of interferon, subjecting this solution to chromatography on sulphomethylcellulose at a pH of about 2 with an increasing chloride gradient, subjecting the biologically active fractions to chromatography on diethylaminoethylcellulose at a pH of between 6.0 and 8.0 with an increasing phosphate concentration and (a) repeatedly subjecting the eluate from the chromatography to further chromatography on diethylaminoethylcellulose at a pH of between 5 and 6 with an increasing phosphate gradient and recovering interferon from the chromatogram and (b) contacting the eluate with diethylaminoethylcellulose at a pH of about 4.5 and recovering interferon from the eluate.

The following example illustrates the invention.

Interferon was produced by a method that has already been described, that is, by incubating ultra-violet-inactivated influenza virus with chick chorio-allantoic membranes suspended in buffered salt solution. Interferon was released into the medium over a period of 48 hours, after which the medium was collected and clarified by low speed centrifugation. Ammonium sulphate was added to 73% saturation, and left overnight at 2° C. The precipitate was dissolved in a small volume of buffered salt solution (Earle's buffered saline) which was then pressure dialysed overnight against a 0.1 M potassium chloride—hydrochloric acid buffer (pH 2.0) and then finally against Earle's buffered saline. In this way a 100-fold concentration was achieved without any loss of biological activity.

The concentrate was chromatographed on sulphomethylcellulose at pH 2.0 using a 0.1 M potassium chloride—hydrochloric acid buffer.

A single broad peak was obtained with the biological activity concentrated in the later fractions. The active fractions were then concentrated, (buffered to pH 6.6 with 0.01 M potassium phosphate buffer) and chromatographed on diethylaminoethylcellulose at pH 6.6 with an increasing phosphate concentration.

A single peak was obtained which was however shown to contain four components by starch-gel electrophoresis at pH 8.9.

The components were individually eluted by electrophoresis and tested for their ability to inhibit the multiplication of influenza virus. Only one, fraction A, was found to be active.

Interferon was separated from the other components by repeated chromatography of the pH 6.6 eluate at pH 5.8 on diethylaminoethylcellulose with an increasing phosphate gradient, or better, by also running on a diethylaminoethylcellulose column at pH 4.5 with 0.01 M sodium acetate buffer. Under these conditions interferon was not retained by the column, and was recovered quantitatively in the eluate. The other components were however retained by the column. The effluent was then chromatographed on diethylaminoethylcellulose at pH 5.8 with an increasing phosphate concentration.

A single symmetrical peak was obtained which gave a single band on starch-gel electrophoresis at both pH 8.9 and pH 2, and which exhibited a single component of $S_{20}$, W=4.77 when examined in the analytical ultracentrifuge. Molecular weight determination by the Archibald method gave a value of 63,000.

Table I shows the purification obtained.

TABLE I

Purification of Interferon

| Stage | Average purification factor | Average activity recovery, percent |
|---|---|---|
| 1. Ammonium sulphate precipitation followed by pressure dialysis | 2.7 x | 100 |
| 2. Chromatography on sulphomethyl cellulose at pH 2 | 2.1 x | 60 |
| 3. Concentration and adjustment to pH 6.6 | 1.2 x | 100 |
| 4. Chromatography on DEAE cellulose at pH 6.6 | 1.3 x | 100 |
| 5. Adjustment to pH 4.5 and chromatography on DEAE cellulose at pH 4.5 | 2.4 x | 100 |
| 6. Adjustment to pH 5.8 and chromatography at pH 5.8 | 0.8 x | 25 |
| 7. Overall | 17 x | 15 |

The purified preparation depressed virus growth, in the test-system used to 3% of that obtained in controls, at a concentration of 6 µg./ml. The purified preparation exhibited a typical protein ultra-violet absorption spectrum, and the results of analysis for nucleic acids, for carbohydrate and for hexosamine are shown in Table II.

TABLE II

*Analysis of Purified Interferon*

| | Percent |
|---|---|
| Ribonucleic acid | 0 |
| Deoxyribonucleic acid | 0.3 |
| Carbohydrate | 1.6 |
| Hexosamine | 2.4 |

Similar results were obtained using an interferon prepared from calf kidney tissue.

What I claim is:

1. A process for the purification of interferon which comprises subjecting a concentrate of interferon in a salt solution to pressure dialysis to produce a solution containing a largely increased content of interferon, subjecting the solution to chromatography on sulphomethylcellulose at a pH of about 2 with an increasing chloride gradient, subjecting the solution to chromatography on diethylaminoethylcellulose with an increasing phosphate gradient in two stages one of which is conducted at a pH of 5.5 to 8.0 and the other of which is conducted at a pH of 4.4 to 4.6 and recovering interferon of increased purity and concentration from the chromatograms.

2. A process for the purification of interferon which comprises subjecting a concentrate of interferon in a salt solution to pressure dialysis to produce a solution containing a largely increased content of interferon, subjecting the solution to chromatography on sulphomethylcellulose at a pH of about 2 with an increasing chloride gradient, subjecting the solution to chromatography on diethylaminoethylcellulose with an increasing phosphate gradient in two stages one of which is conducted at a pH of 6.6 and the other of which is conducted at a pH of 4.5 and recovering interferon of increased purity and concentration from the chromatograms.

3. A process for the purification of interferon which comprises dialyzing under pressure a buffered aqueous salt solution containing interferon to produce a solution containing a largely increased content of interferon, subjecting the solution to chromatography on sulphomethylcellulose at a pH of about 2 with an increasing chloride gradient, subjecting the biologically active fractions to chromatography on diethylaminoethylcellulose at a pH of 6.0 to 8.0 with an increasing phosphate concentration and (a) repeatedly subjecting the eluate from the chromatography to further chromatography on diethylaminoethylcellulose at a pH of 5 to 6 with an increasing phosphate gradient and recovering interferon from the chromatogram and (b) contacting the eluate with diethylaminoethylcellulose at a pH of about 4.5 and recovering interferon from the eluate.

4. A process for the purification of interferon which comprises dialyzing under pressure a buffered aqueous salt solution containing interferon to produce a solution containing a largely increased content of interferon, subjecting the solution to chromatography on sulphomethylcellulose at a pH of about 2 with an increasing chloride gradient, subjecting the biologically active fractions to chromatography on diethylaminoethylcellulose at a pH of 6.6 with an increasing phosphate concentration and (a) repeatedly subjecting the eluate from the chromatography to further chromatography on diethylaminoethylcellulose at a pH of 5.8 with an increasing phosphate gradient and recovering interferon from the chromatogram and (b) contacting the eluate with diethylaminoaminoethylcellulose at a pH of about 4.5 and recovering interferon from the eluate.

References Cited in the file of this patent

UNITED STATES PATENTS

| | | |
|---|---|---|
| 2,957,809 | Brink et al. | Oct. 25, 1960 |
| 2,974,088 | Lewis et al. | Mar. 7, 1961 |
| 3,003,918 | Sanders et al. | Oct. 10, 1961 |

OTHER REFERENCES

Burke et al.: Some factors affecting the production of interferon. Brit. J. Exp. Path. 39(5), pp. 452–458, October 1958.

Isaacs et al.: "Effect of interferon on the growth of Viruses on the Chick Chorion" Ibid, 39(5), pp. 447–451, October 1958.

Isaacs et al.: "Mode of action of interferon," Nature 182 (4642) pp. 1073–1074, Oct. 18, 1958.

Allison et al.: "The nucleic acid contents of viruses" J. Gen. Microbiol., vol. 27, pp. 181–194, February 1962.

Burke: The purification of interferon. Biochem. J., vol. 78, pp. 556–563, March 1961.

Burke: Virus interference and interferon. A new approach to virus chemotherapy. Res. Appl. Industry vol. 10, pp. 398–403, October 1960.

Porterfield et al.: "An estimate of the molecular weight of interferon as measured by its rate of diffusion through agar" Virology, vol. 12, pp. 197–203, October 1960.

Burke et al.: "Interferon: relation to heterologous, interference, and lack of antigenicity," Acta Virol (Eng.) vol. 4, pp. 215–219, July 1960.

Isaacs et al.: "Viral interference and interferon" Brit. Med. Bull., vol. 15, pp. 185–188, September 1959.

Hoyer et al.: "Mammalian Viruses and Rickettsial—Their purification and recovery by cellulose anion exchange columns . . ." Science, vol. 127, No. 3303, pp. 859–863, Apr. 18, 1958.

Korn: "Observations on the use of cellulose ion exchanges for the chromatographic separation of nucleotides," Biochim. Biophys. Acta, vol. 32, pp. 554–555, April 1959.

Speer et al.: "Protein Fractionation I. Chromatography of human serum proteins on DEAE-cellulose with special reference to blood group antibodies," J. Lab. Clin. Med. 54, pp. 685–693, November 1959.

Haruna et al.: Separation of adenovirus by chromatography on DEAE-cellulose, Virology 13, pp. 264–267, February 1961.